(12) United States Patent
Higashiyama et al.

(10) Patent No.: US 8,937,450 B2
(45) Date of Patent: Jan. 20, 2015

(54) MOTOR DRIVING SYSTEM AND MOTOR SYSTEM

(75) Inventors: Shin Higashiyama, Sakai (JP); Satoshi Yagi, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 181 days.

(21) Appl. No.: 13/821,912

(22) PCT Filed: Sep. 12, 2011

(86) PCT No.: PCT/JP2011/070719
§ 371 (c)(1),
(2), (4) Date: Mar. 8, 2013

(87) PCT Pub. No.: WO2012/039309
PCT Pub. Date: Mar. 29, 2012

(65) Prior Publication Data
US 2013/0162185 A1 Jun. 27, 2013

(30) Foreign Application Priority Data

Sep. 22, 2010 (JP) .................................. 2010-211919

(51) Int. Cl.
| | |
|---|---|
| H02P 27/00 | (2006.01) |
| H02P 6/24 | (2006.01) |
| H02P 29/02 | (2006.01) |
| H02P 27/06 | (2006.01) |

(52) U.S. Cl.
CPC H02P 6/24 (2013.01); H02P 29/02 (2013.01); H02P 27/06 (2013.01)
USPC .................. 318/799; 318/400.14; 318/400.15; 318/800; 318/801; 363/40; 363/95; 363/174; 363/175; 361/679.48; 361/695

(58) Field of Classification Search
USPC ............ 318/400.01, 400.07, 400.14, 400.15, 318/721, 799, 800, 801, 430, 432, 437; 363/21.1, 21.17, 34, 40, 41, 44, 52, 55, 363/81, 84, 89, 95, 98, 102, 108, 109, 114, 363/120, 124, 125, 131, 141, 174, 175, 363/176; 361/30, 91.4, 152, 170, 679.48, 361/695
See application file for complete search history.

(56) References Cited

U.S. PATENT DOCUMENTS 6,181,583 B1 * 1/2001 Okui et al. ...................... 363/45

FOREIGN PATENT DOCUMENTS

| | | |
|---|---|---|
| JP | 2009-77609 A | 9/2008 |
| JP | 4153586 B2 | 9/2008 |

* cited by examiner

*Primary Examiner* — Antony M Paul
(74) *Attorney, Agent, or Firm* — Birch, Stewart, Kolasch & Birch, LLP

(57) ABSTRACT

A motor driving system including command value output means configured to output an analog value according to a rotation speed command; a first power line having first switching means; a drive circuit, to which power is supplied via the first switching means and the first power line, driving a motor supplying rotation based on the analog value; and switching control means configured to make the first switching means nonconductive when the analog value is smaller than a first predetermined value, and independent of the command value output means.

12 Claims, 9 Drawing Sheets

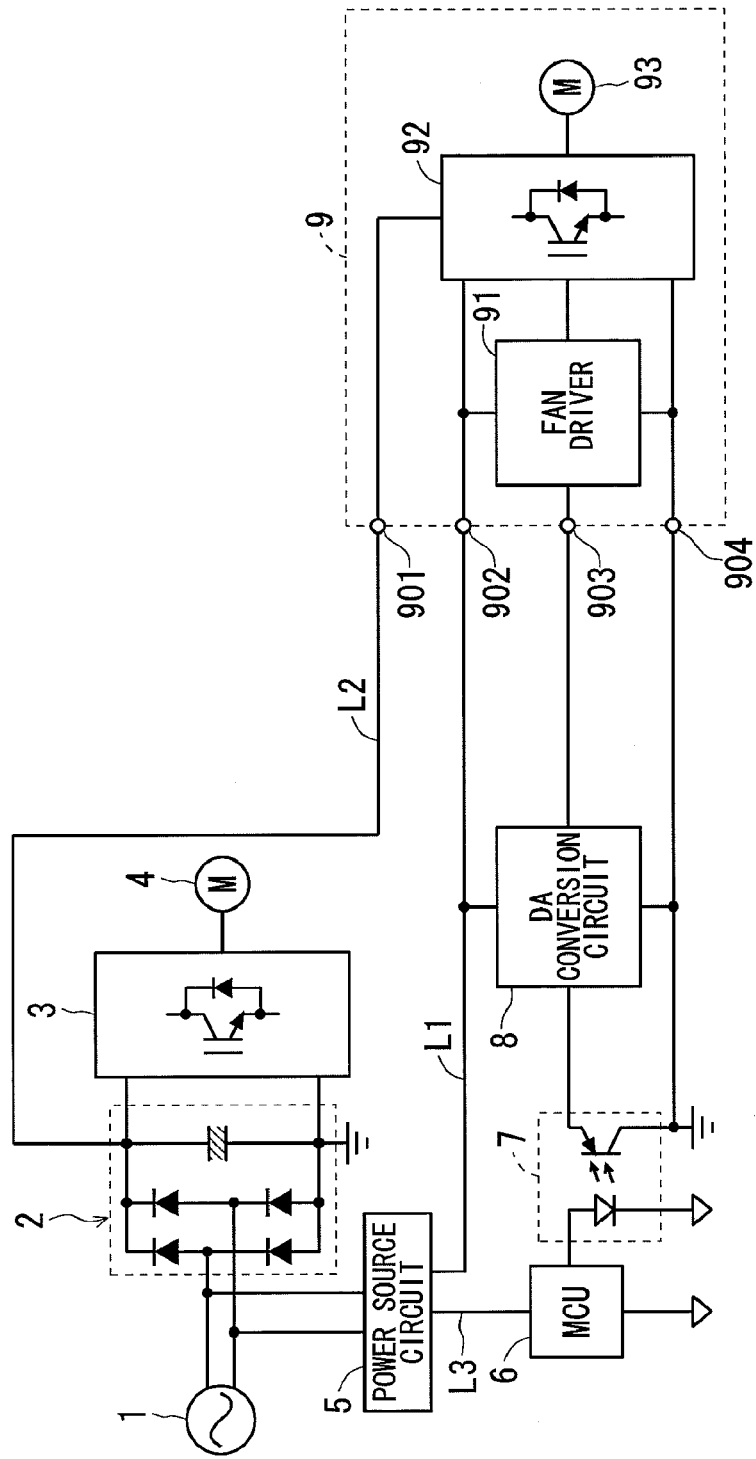
F I G . 1 3

MOTOR DRIVING SYSTEM AND MOTOR SYSTEM

TECHNICAL FIELD

The present invention relates to a motor driving system for driving a motor, which system, for example, can be applied to a technique for driving a fan in an air-conditioning apparatus.

BACKGROUND ART

There has been proposed a technique for reducing consumed power of a motor for a blowing machine during a period in which an air-conditioning apparatus stops including a standby period.

For example, according to Japanese patent No. 4153586, a microcomputer unit provided for an interior control section outputs a rotation number command to a PWM DC motor having a motor driver built therein. Then, if the rotation number command is determined to be zero, it is determined whether or not the motor has stopped. Whether or not the motor has stopped is determined based on a feedback rotation number signal (rotation number return). If it has been determined that the motor has stopped, power supply to the PWM DC motor is blocked.

SUMMARY OF THE INVENTION

Problems to be Solved by the Invention

However, according to the technique described in Japanese patent No. 4153586, the microcomputer unit itself, which outputs a zero rotation number command, first confirms stop of the motor based on the rotation number return, and then blocks a relay in a power supply path to the PWM DC motor. In such control, the microcomputer unit outputting a rotation number command also performs determination processing for confirming stop of the motor, and processing for blocking the relay in a manner of an interrupt action. This results in, in terms of software, a problem of delay in processing by the microcomputer unit, and in terms of hardware, a problem that it is necessary to additionally provide a signal port for blocking the relay.

The present invention is made in order to avoid such problems, and aims to provide a technique for not supplying unnecessary power to a drive circuit for driving a motor when the motor does not substantially rotate, without having a microcomputer unit to perform determination processing for confirming stop of the motor, or processing for blocking a relay in a manner of an interrupt action.

Means for Solving the Problems

A first aspect of a motor driving system according to the present invention includes: command value output means (6, 7, 8) configured to output an analog value ($V_{sp}$) according to a rotation speed command ($V_{spp}$); a first power line (L1, L2) having first switching means (K1, K2); a drive circuit (91, 92), to which power is supplied via the first switching means and the first power line, driving a motor (93) supplying rotation based on the analog value; and switching control means (10A, 10B) configured to make the first switching means nonconductive when the analog value is smaller than a first predetermined value ($V_{spb}$), and independent of the command value output means.

It is preferable that the drive circuit include an inverter (92) outputting current to the motor (93) and a driver (91) controlling the inverter, and the first power line (L1) be a power supply path for operation power to the driver.

It is preferable that the drive circuit include an inverter (92) outputting current to the motor (93), and the first power line (L2) be a power supply path for input power to the inverter.

It is preferable that a second power line (L2) having second switching means (K2) be further provided, the second power line be a power supply path for input power to the inverter (92), and the switching means also make the second switching means nonconductive when the analog value is smaller than a second predetermined value.

A second aspect of the motor driving system according to the present invention includes: a microcomputer unit (6) configured to output a pulse signal according to a rotation speed command; a power line (L1) having switching means (K1); a DA converter (8), to which power is supplied via the switching means and the power line, outputting an analog value after performing D/A conversion to the pulse signal; a drive circuit (91, 92), to which operation power is supplied via the switching means and the power line, driving a motor (93) supplying rotation based on the analog value; and switching control means (10C) making the switching means nonconductive when a value of integral of the pulse signal is smaller than a predetermined value, and independent of the DA converter.

It is preferable that there be provided: a microcomputer unit (6) configured to output a pulse signal according to a rotation speed command; a power line (L1) having switching means (K1); command value output means (7, 8), to which power is supplied via the switching means and the power line, and that is configured to output an analog value after performing D/A conversion to the pulse signal; a drive circuit (91, 92), to which operation power is supplied via the switching means and the power line, driving a motor (93) supplying rotation based on the analog value; and switching control means (10D) configured to make the switching means nonconductive when a value of integral of a signal whose absolute value increases upon the pulse signal exceeding a predetermined value is smaller than another predetermined value, and independent of the command value output means.

A third aspect of the motor driving system according to the present invention is the first aspect or the second aspect in which the pulse signal is configured such that a pulse width and a duty ratio during a predetermined period after power starts being supplied to the motor unit (9) are smaller than after the predetermined period ends.

A motor system according to the present invention includes: the motor driving system according to one of the first to the third aspects of the motor driving system; and a motor unit (9) having the drive circuit (91, 92) and the motor (93) that are built therein.

Effects of the Invention

According to the first aspect of the motor driving system of the present invention, unnecessary power is not supplied to the drive circuit when the motor does not substantially rotate. In addition, as the switching control means makes the switching means nonconductive independently of the command value output means, it is not necessary for the command value output means to perform determination processing on whether or not the analog value is smaller than the first predetermined value, or interruption processing when smaller than the first predetermined value.

According to the second aspect of the motor driving system of the present invention, unnecessary power is not supplied to the drive circuit or the command value output means when the motor does not substantially rotate. In addition, as the switching control means makes the switching means nonconductive independently of the command value output means, it is not necessary for the command value output means to perform determination processing on whether or not the analog value is smaller than the predetermined value, or interruption processing when smaller than the predetermined value.

According to the third aspect of the motor driving system of the present invention, it is possible to gain time until the drive circuit is supplied with power and its function operates normally.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a circuit diagram exemplarily showing an internal configuration of a circuit that can be employed as a voltage detecting circuit and the like;

FIG. 7 is a circuit diagram exemplarily showing an internal configuration of a circuit that can be employed as the voltage detecting circuit or the like;

FIG. 13 is a circuit diagram showing a configuration of a motor system in a case in which a voltage detecting circuit and a switch are not provided.

EMBODIMENT FOR CARRYING OUT THE INVENTION

First Embodiment

Figure 1:
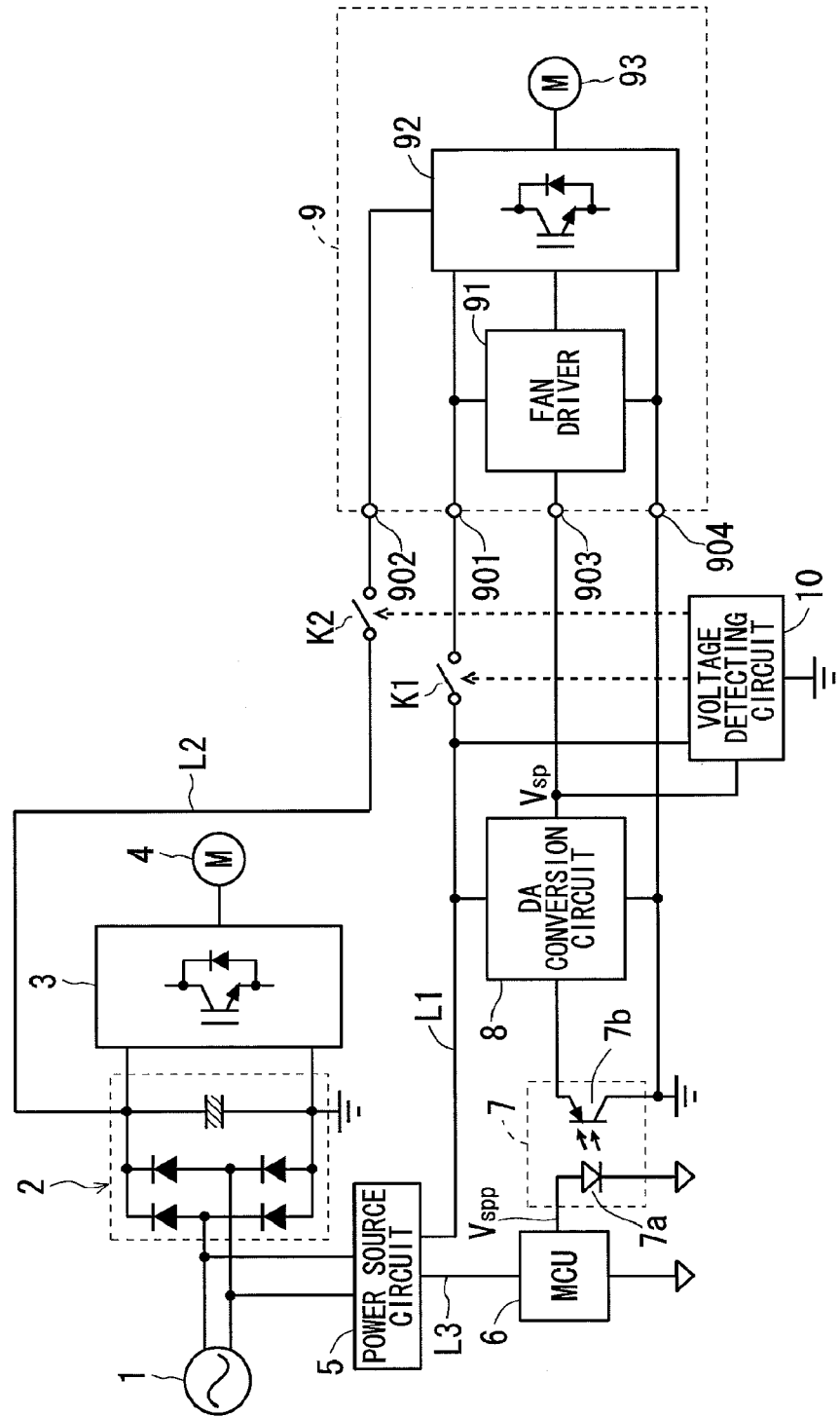
FIG. 1 is a circuit diagram showing a configuration of a motor system according to a first embodiment of the present invention.

FIG. 1 is a circuit diagram showing a configuration of a motor system according to a first embodiment of the present invention. FIG. 1 exemplarily shows a case in which the motor system is applied to an air-conditioning apparatus. The motor system includes a motor 4 for a compression machine for driving a compression machine (not depicted), and a fan motor unit 9 for supplying rotation to a fan for blowing air to a heat exchange machine (both not depicted).

The fan motor unit 9 is a motor unit and is a driver built-in motor, for example. The fan motor unit 9 includes a fan driver 91, a PWM inverter 92, and a fan motor 93 that are built therein. However, the fan motor unit 9 does not necessarily have to include the fan driver 91 and the PWM inverter 92 built therein. The fan driver 91, or the fan driver 91 and the PWM inverter 92, can be provided outside the fan motor unit 9. The above described fan is attached to the fan motor 93.

An AC voltage supplied from a commercial power source 1 is once rectified to a first DC voltage by a rectify circuit 2. The first DC voltage is supplied (power is supplied) through a power line L2 to the PWM inverter 92 via a switch K2. Specifically, the fan motor unit 9 has a terminal 902, and the terminal 902 is connected to a high-voltage side of the PWM inverter 92. Then, the power line L2 is connected to the terminal 902 via the switch K2.

The first DC voltage is converted to an AC voltage by a PWM inverter 3. Then, the AC voltage is supplied to the motor 4 for a compression machine, and the motor 4 for a compression machine is driven.

A power source circuit 5 rectifies AC power supplied from the commercial power source 1, and outputs a second DC voltage and a third DC voltage. The second DC voltage is outputted to a power line L3, and the third DC voltage is outputted to a power line L1.

An MCU (microcomputer unit) 6 outputs a pulsed rotation speed command $V_{spp}$ for commanding rotation speed of the fan motor 93, taking the second DC voltage as its operating voltage.

A DA conversion circuit 8 outputs an analog voltage value (hereinafter tentatively referred to as an "analog command value") $V_{sp}$, taking the third DC voltage as its operating voltage, by performing DA conversion to the rotation speed command obtained command via a photocoupler 7. The analog command value $V_{sp}$ is inputted to the fan driver 91 via a terminal 903 of the fan motor unit 9.

The MCU 6, the photocoupler 7, and the DA conversion circuit 8 can be considered as command value output means for outputting the analog command value $V_{sp}$ upon which the rotation of the fan motor 93 is based. Further, the fan motor 93 can be considered to supply the rotation based on the analog command value $V_{sp}$.

The fan driver 91 controls the PWM inverter 92 based on the analog command value $V_{sp}$, taking the third DC voltage as its operating voltage. The third DC voltage is supplied (power is supplied) through the power line L1 to the fan driver 91 via a switch K1. Specifically, the fan motor unit 9 has a terminal 901, and the terminal 901 is connected to a high-voltage side of the fan driver 91. Then, the power line L1 is connected to the terminal 901 via the switch K1. The PWM inverter 92 outputs a current to motor 93 to cause the motor to perform a rotational motion. Thus, the PWM inverter 92 can be considered as a drive circuit for, in combination with the fan driver 91, driving the motor 93.

When the switches K1 and K2 are in a conduction state, the third DC voltage and the first DC voltage are supplied to the fan motor unit 9 respectively therethrough.

The control of conduction/nonconduction of the switches K1 and K2 is performed by a voltage detecting circuit 10. Specifically, the switches K1 and K2 are made conductive if the analog command value $V_{sp}$ is equal to or greater than a predetermined value, and the switches K1 and K2 are made nonconductive if the analog command value $V_{sp}$ is smaller than the predetermined value. In this manner, the voltage detecting circuit 10 for controlling the conduction/nonconduction of the switches K1 and K2 can be considered as switching control means independent of the command value output means for outputting the analog command value $V_{sp}$. The switches K1 and K2 can be considered collectively as switching means. In this case, the drive circuit is considered to be supplied with power via the switching means.

Then, when in a case in which the analog command value $V_{sp}$ is smaller than a first predetermined value and indicates that the fan motor unit 9 does not substantially rotate, unnecessary power is not supplied to the fan motor unit 9 by the voltage detecting circuit 10 making the switches K1 and K2 nonconductive. In addition, the voltage detecting circuit 10 makes the switches K1 and K2 nonconductive independently of the command value output means. Thus, it is not necessary for the command value output means to perform determination processing on whether or not smaller than the predetermined value, or interruption processing when smaller than the predetermined value.

FIG. 13 is a circuit diagram showing a configuration of the motor system in a case in which the voltage detecting circuit 10 and the switches K1 and K2 are not provided. This configuration is referred herein as a comparative example of this embodiment. In such a configuration, power is supplied to the fan driver 91 and/or the PWM inverter 3 even when the fan motor unit 9 is not substantially driven, and thus unnecessary power is consumed. In contrast, according to this embodiment, such unnecessary power consumption can be avoided.

As a matter of course, only one of the switches K1 and K2 can be provided. Alternatively, threshold values for the analog command value $V_{sp}$ for controlling the conduction/nonconduction of the switches K1 and K2 can be made different from each other. For example, the switch K1 can be made nonconductive/conductive depending on whether or not the analog command value $V_{sp}$ is smaller than the first predetermined value, and the switch K2 can be made nonconductive/conductive depending on whether or not the analog command value $V_{sp}$ is smaller than the second predetermined value.

The MCU 6 is configured such that its ground is separated from the DA conversion circuit 8, the fan motor unit 9, and the voltage detecting circuit 10 by the photocoupler 7. Specifically, a photodiode 7a of the photocoupler 7 and the MCU 6 have a common ground, and the ground (hereinafter tentatively referred to as a "first ground") is indicated by a triangle in the drawings. On the other hand, a phototransistor 7b of the photocoupler 7, the DA conversion circuit 8, the fan motor unit 9, and the voltage detecting circuit 10 have a common ground, and the ground (hereinafter tentatively referred to as a "second ground") is indicated by a symbol using plural transverse lines.

The fan motor unit 9 has a terminal 904. Inside the fan motor unit 9, a ground side of the fan driver 91 and a ground side of the PWM inverter 92 are connected to the terminal 904. The terminal 904 is connected to the second ground. A low-voltage side of the rectify circuit 2 is also connected to the second ground.

Figure 2:
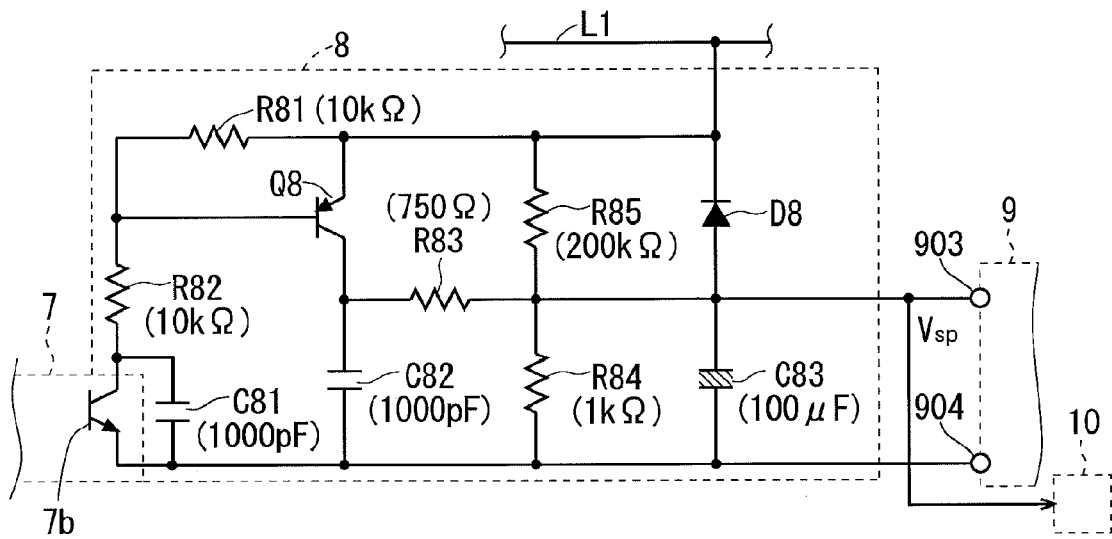
FIG. 2 is a circuit diagram exemplarily showing an internal configuration of a DA conversion circuit.

FIG. 2 is a circuit diagram exemplarily showing an internal configuration of the DA conversion circuit 8. The phototransistor 7b of the photocoupler 7 is of an npn type whose emitter is connected to the second ground, and whose collector is connected to the power line L1 via serial connection of resistors R81 and R82. The resistor R81 is provided nearer a side of the power line L1 than the resistor R82 is, and a base of a transistor Q8 is connected to a connecting point therebetween. The transistor Q8 is of a pnp type, and its emitter is connected to the power line L1.

Resistors R84 and R85 are serially connected between the power line L1 and the second ground, and the resistor R84 is provided near a side of the second ground. A collector of the transistor Q8 is connected to a connecting point between the resistors R84 and R85 via a resistor R83. Further, a capacitor C83 is provided in parallel with the resistor R84, and a diode D8 is provided in parallel with the resistor R85. A cathode of the diode D8 is connected to the power line L1.

A capacitor C81 is connected between collector-emitter of the phototransistor 7b. A capacitor C82 is connected between the collector of the transistor Q8 and the second ground.

The pulsed rotation speed command outputted by the MCU 6 makes the phototransistor 7b conductive/nonconductive in the photocoupler 7.

When the phototransistor 7b is nonconductive, a voltage between the third DC voltage applied to the power line L1 and the second ground is divided by the resistors R84 and R85. A resistance value at the resistor R85 is set to be extremely greater than a resistance value at the resistor R84, and therefore the capacitor C83 is hardly charged. For example, the resistance values at the resistors R84 and R85 are set to 1 kΩ and 200 kΩ, respectively.

On the other hand, when the phototransistor 7b is conductive, the voltage between the third DC voltage and the second ground is divided by the resistors R81 and R82. The divided voltage is applied as a bias voltage to a base of the transistor Q8. For example, the resistance values at the resistors R81 and R82 are set to an extent comparable with each other, and set to 10 kΩ.

When the bias voltage is applied to the base of the transistor Q8, the transistor Q8 becomes conductive. When the transistor Q8 becomes conductive, the voltage between the third DC voltage and the second ground is divided by parallel connection between the resistor R83 and the resistor R85, and by the resistor R84. The resistance values at the resistors R83 and R84 are set to an extent comparable with each other, and the resistance value at the resistor R85 is set to be about several times greater than the resistance value of the resistor R83. For example, the resistance values at the resistors R85, R84, and R83 are set to 200 kΩ, 1 kΩ, and 750 kΩ, respectively. Thus, the voltage divided by the resistors R83 and R84 is a voltage on the comparable order of the third DC voltage, and the capacitor C83 is charged.

A voltage between both ends of the capacitor C83 is outputted as the analog command value $V_{sp}$. Here, as the ground of the DA conversion circuit 8 and the ground of the fan motor unit 9 are both the second ground, a potential on a high-voltage side of the capacitor C83 can be employed as the analog command value $V_{sp}$. Thus, in FIG. 2, a connecting point among the resistors R83, R84, and R85 are connected to the terminal 903.

As described above, as the capacitor C83 functions as an integrator for obtaining the analog command value $V_{sp}$, a capacitance value on the order of 100 μF, for example, is employed. On the other hand, as the capacitors C81 and C82 are provided for noise reduction, a capacitance value on the order of 1000 pF, for example, is employed.

The diode D8 does not allow the capacitor C83 to be charged directly from the power line L1, and thereby functions as input protection for the terminal 903 of the fan motor unit 9.

Figure 3:
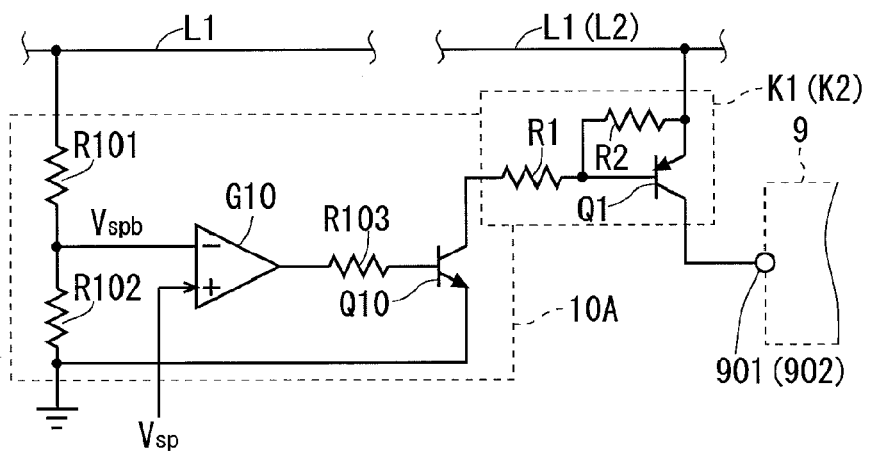

FIG. 3 is a circuit diagram exemplarily showing an internal configuration of a circuit 10A that can be employed as the voltage detecting circuit 10 and the switch K1 (or the switch K2). The circuit 10A includes resistors R101 and R102 serially connected between the power line L1 and the second ground. A voltage divided by the resistors R101 and R102 is employed as a predetermined value $V_{Spb}$ as a comparison criterion with the analog command value $V_{sp}$.

The circuit 10A further includes a comparator G10. The comparator G10 outputs a high potential/low potential according to a result of comparison on whether or not the analog command value $V_{sp}$ is equal to or greater than the predetermined value $V_{spb}$. Specifically, the analog command value $V_{sp}$ is inputted to a non-inverting input terminal of the comparator G10, and the predetermined value $V_{spb}$ is inputted to an inverting input terminal of the comparator G10.

The circuit 10A further includes an npn transistor Q10 and a resistor R103. An output from the comparator G10 is supplied to a base of the npn transistor Q10 via the resistor R103. An emitter of the npn transistor Q10 is connected to the second ground, and constitutes an output stage of an open collector type.

The switch K1 includes a pnp type transistor Q1 and the resistors R1 and R2. An emitter of the transistor Q1 is connected to the power line L1. The resistor R2 is connected between the emitter and a base of the transistor Q1, and one terminal of the resistor R1 is connected to the base of the transistor Q1. The transistor Q1 constitutes an output stage of an open collector type, and a collector of the transistor Q1 is connected to the terminal 901.

Then, the other terminal of the resistor R1 of the switch K1 is connected to a collector of the transistor Q10 of the circuit 10A. With this, the voltage between the third DC voltage and the second ground is applied between collector-emitter of the transistor Q10 via the serial connection of the resistors R1 and R2.

If the output from the comparator G10 is a high potential (that is, if the analog command value $V_{sp}$ is equal to or greater than the predetermined value $V_{spb}$), the high potential is applied to the base of the transistor Q10 via the resistor R103, the transistor Q10 becomes conductive, a base potential of the transistor Q1 decreases, and the transistor Q1 becomes conductive. With this, the power line L1 is connected to the terminal 901.

If the output from the comparator G10 is a low potential (that is, if the analog command value $V_{sp}$ is smaller than the predetermined value $V_{spb}$), the low potential is applied to the base of the transistor Q10 via the resistor R103, and the transistor Q10 becomes nonconductive. This turns the base potential of the transistor Q1 to be in a floating state, and the transistor Q1 becomes nonconductive. With this, the terminal 901 is blocked from the power line L1.

Figure 4:
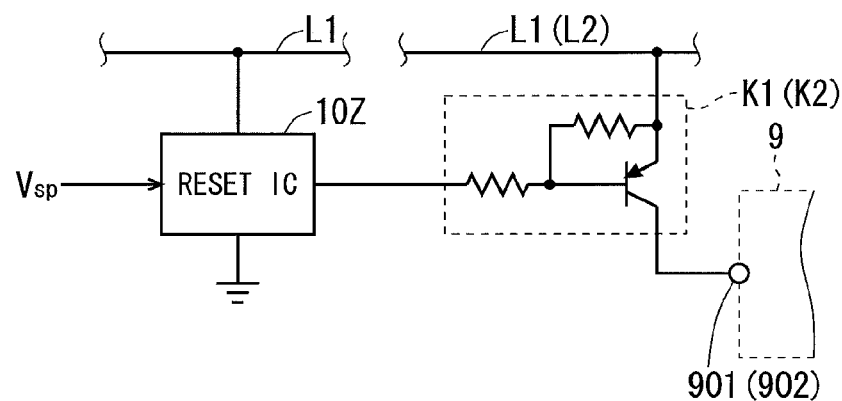
FIG. 4 is a circuit diagram showing a case in which a reset IC is employed as the voltage detecting circuit.

FIG. 4 is a circuit diagram showing a case in which a circuit 10Z commonly known as a reset IC is employed as the voltage detecting circuit 10. The predetermined value $V_{spb}$ can be set for the reset IC 10Z, and the switch K1 is controlled according to a result of comparison between this and the analog command value $V_{sp}$.

In either of the circuits of FIG. 3 or FIG. 4, by replacing the power line L1 and the switch K1 respectively with the power line L2 and the switch K2, it is possible to obtain configuration for supplying the first DC voltage to the fan motor unit 9 and stopping the supply.

Second Embodiment

Here, by configuring as described above, in a state in which the fan motor unit 9 substantially stops, power supply to the fan driver 91 and/or the PWM inverter 92 is stopped. When driving the fan motor unit 9 in such a state, it is envisaged that even if the analog command value $V_{sp}$ becomes equal to or greater than the predetermined value $V_{spb}$ and power is immediately supplied to the fan driver 91 and/or the PWM inverter 92, functions of these do not normally operate immediately. Therefore, when the analog command value $V_{sp}$ makes a transition from a value smaller than the predetermined value $V_{spb}$ to a value above this, it is preferable that the transition be chronologically sluggish.

Figure 5:
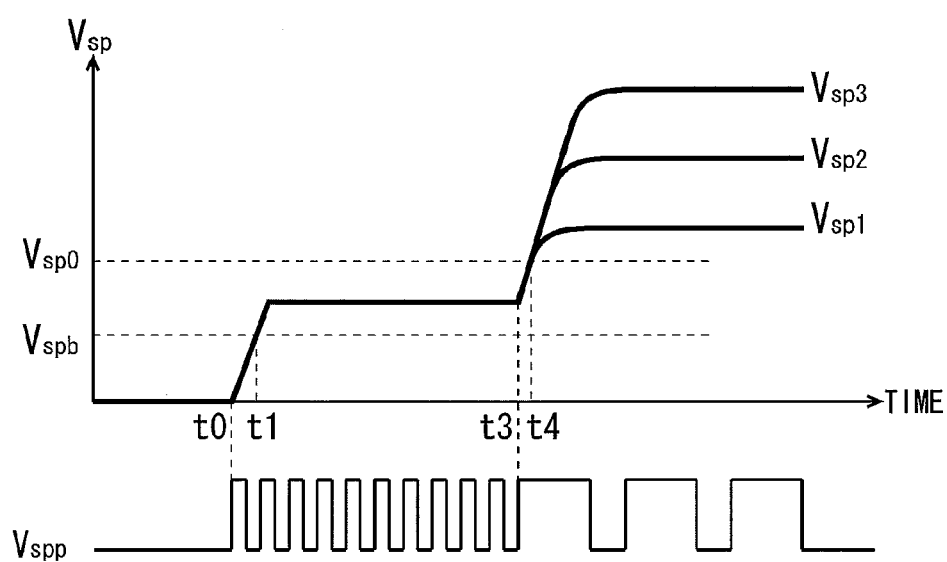
FIG. 5 is a chart showing a preferred aspect when an analog command value makes a transition.

FIG. 5 is a chart showing a preferred aspect when the analog command value $V_{sp}$ makes a transition from the value smaller than the predetermined value $V_{spb}$ to values above this $V_{sp}1$, $V_{sp}2$, and $V_{sp}3$. However, it is assumed that $V_{sp}1<V_{sp}2<V_{sp}3$, here. Further, a value $V_{sp}0$ is lowest of the analog command value $V_{sp}$ at which the fan motor 93 substantially rotates.

In FIG. 5, a case in which the pulsed rotation speed command starts being outputted from the MCU 6 at time t0 is exemplarily shown. With this, the analog command value $V_{sp}$ becomes equal to or greater than the predetermined value $V_{spb}$ at time t1. At first (from time t1 to t3 in FIG. 5), the rotation speed command is such that a pulse width and its duty ratio are small, and thus a rate of rise of the analog command value $V_{sp}$ becomes sluggish after rising to a certain degree. This is because, for example, the capacitor C83 of the DA conversion circuit 8 (FIG. 2) discharges through the resistor R84 while the transistor Q8 is turned off.

In this manner, after the analog command value $V_{sp}$ becomes equal to or greater than the predetermined value $V_{spb}$ at time t1, its rise becomes sluggish until time t3, or flat (FIG. 5 shows the case of the latter). Thus, it is possible to gain time after power is supplied to the fan driver 91 and/or the PWM inverter 92 until the functions of these operate normally. In addition, in a state in which the rise of the analog command value $V_{sp}$ is sluggish or flat, by setting a value that the analog command value $V_{sp}$ takes to be smaller than the value $V_{sp}0$, it is possible to avoid the rotation of the fan motor 93 in a state in which operations of the fan driver 91 and/or the PWM inverter 92 are unstable.

After time t3, the pulse width of the rotation speed command is large and its duty ratio becomes large, the analog command value $V_{sp}$ rapidly rises up to the values $V_{sp}1$, $V_{sp}2$, and $V_{sp}3$. In other words, the pulse width and the duty ratio of the rotation speed command during a predetermined period (t1-t3) after power starts being supplied to the fan motor unit 9 are smaller than those after the predetermined period ends. FIG. 5 schematically shows a case in which as a pulse waveform of the rotation speed command that makes a transition, the analog command value $V_{sp}$ makes a transition to $V_{sp}3$.

Alternatively, it is also preferable to employ the reset IC 10Z exemplarily shown in FIG. 4. This is because a reset IC generally activates its output after a predetermined period has passed after an input of a magnitude that is required to activate the output is obtained.

Third Embodiment

The first predetermined value to be compared with the analog command value $V_{sp}$ for making the switches K1 and K2 conductive from the nonconduction state, and the second predetermined value to be compared with the analog command value $V_{sp}$ for making the switches K1 and K2 nonconductive from the conduction state can be made different from each other. In particular, making the second predetermined value smaller than the first predetermined value is preferable when low speed rotation is maintained after the fan motor 93 is decelerated. For example, the fan motor 93 drives a fan for blowing air to a heat exchange machine. In order to blow air to a certain degree after slowing the blow to the heat exchange machine, it becomes necessary to maintain the above low speed rotation.

Figure 6:
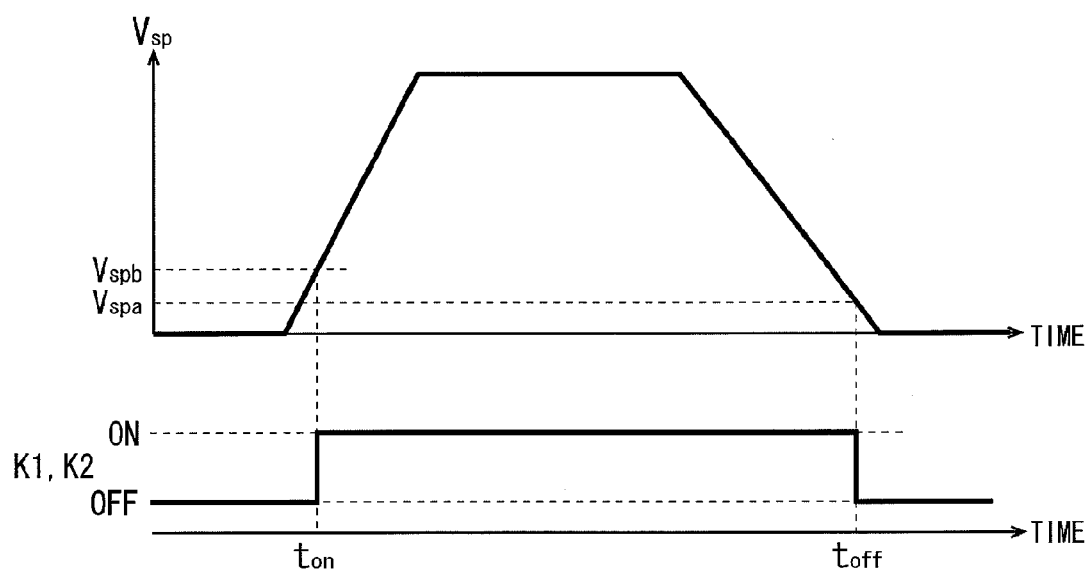
FIG. 6 is a chart exemplarily showing a case in which a second predetermined value is smaller than a first predetermined value.

FIG. 6 is a chart exemplarily showing a case in which a second predetermined value $V_{spa}$ is smaller than a first predetermined value $V_{spb}$. There is shown a case in which the analog command value $V_{sp}$ reaches the first predetermined value $V_{spb}$ from a value smaller than the first predetermined value $V_{spb}$ at time $t_{on}$, and the analog command value $V_{sp}$ reaches the second predetermined value $V_{spa}$ from a value exceeding the first predetermined value $V_{spb}$ at time $t_{off}$. At time $t_{on}$, the switches K1 and K2 make a transition from nonconduction (OFF) to conduction (ON), and at time $t_{off}$, the switches K1 and K2 make a transition from conduction to nonconduction.

As described above, an aspect in which a predetermined value to be compared with the analog command value $V_{sp}$ has so-called hysteresis can be realized by employing the reset IC 10Z described above.

Figure 7:
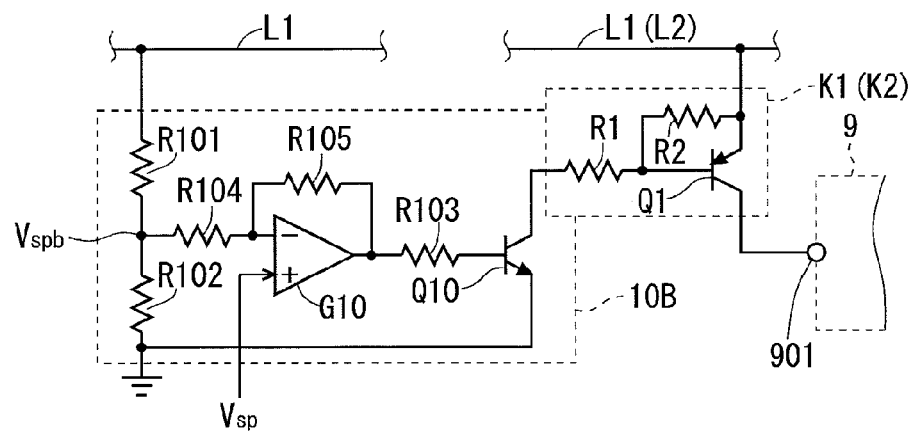

Alternatively, it is possible to add a resistor to the comparator G10 to provide hysteresis for input sensitivity. FIG. 7 is a circuit diagram exemplarily showing an internal configuration of a circuit 10B that can be employed as the voltage detecting circuit 10 and the switch K1 (or the switch K2). The circuit 10B is configured such that resistors R104 and R105 are added to the circuit 10A. The resistor R104 is connected between a connecting point between the resistors R101 and R102 and the inverting input terminal of the comparator G10. The resistor R105 is connected between the inverting input terminal and an output terminal of the comparator G10. A technique for providing hysteresis for the input sensitivity by the resistors R104 and R105 thus configured is well-known per se, and therefore an explanation is omitted here.

Fourth Embodiment

Figure 8:
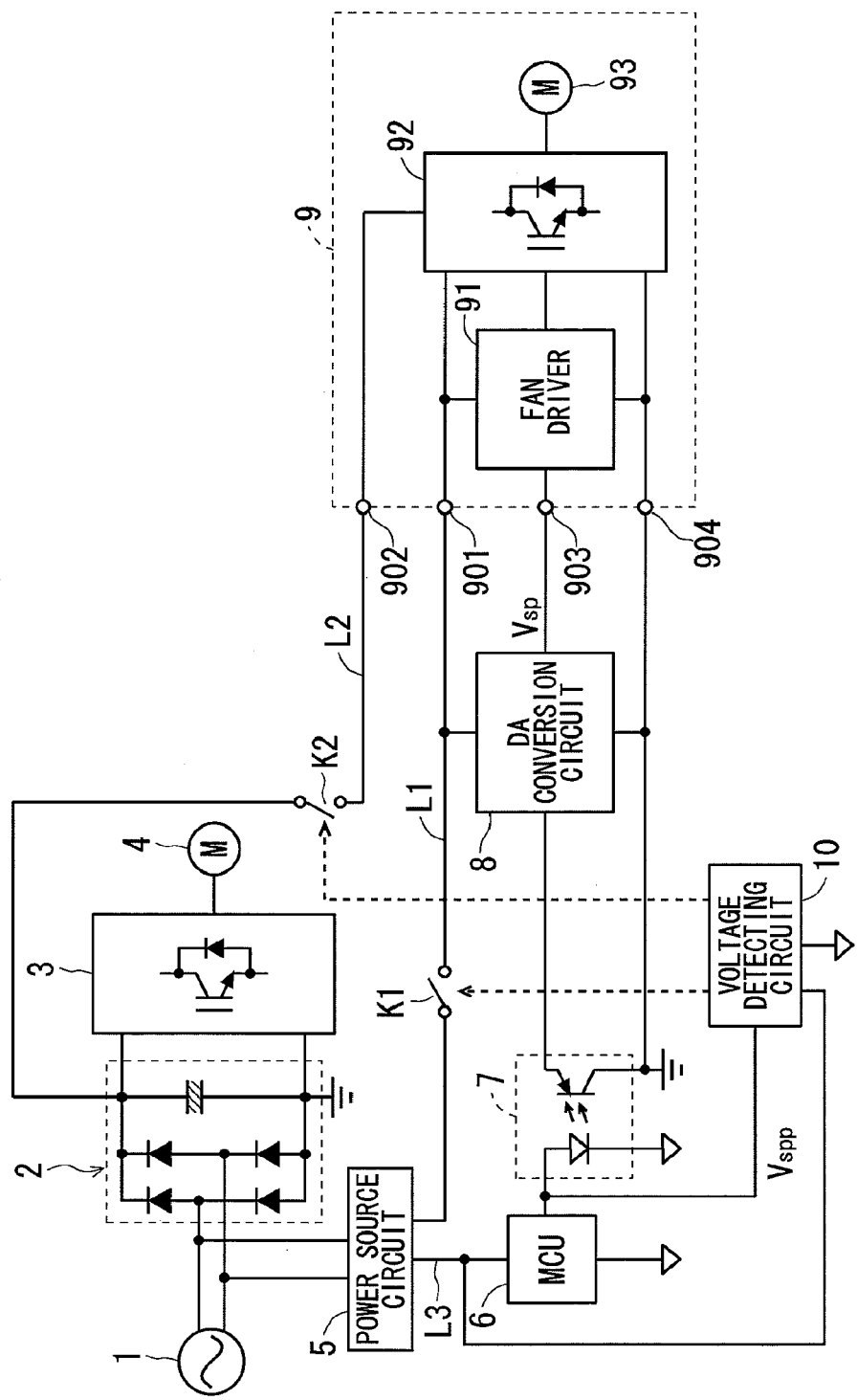
FIG. 8 is a circuit diagram showing a configuration of a motor system according to a fourth embodiment of the present invention.

FIG. 8 is a circuit diagram showing a configuration of a motor system according to a fourth embodiment of the present invention. In this embodiment, the switch K1 is provided along the power line L1 and closer to a side of the power source circuit 5 than the DA conversion circuit 8. With this, power consumption of not only the fan motor unit 9 but also the DA conversion circuit 8 can be reduced. This is because there is no need to operate the DA conversion circuit 8 when the fan motor 93 is not substantially rotated.

However, when controlling start/stop of power supply to the DA conversion circuit 8 based on the analog command value $V_{sp}$, it is not possible to supply power to the DA conversion circuit 8 again if once stopped. Thus, according to this embodiment, switching of the switch K1, or the switches K1 and K2 is controlled based on the rotation speed command $V_{spp}$ but on the analog command value $V_{sp}$.

Specifically, to the voltage detecting circuit 10, the rotation speed command $V_{spp}$ outputted from the MCU 6 is inputted. As the MCU 6 is connected to the first ground, the voltage detecting circuit 10 is also connected to the first ground but to the second ground. Along with this, the voltage detecting circuit 10 takes the second DC voltage as its operating voltage, and the power line L3 but the power line L1 is connected to the voltage detecting circuit 10. As the rotation speed command $V_{spp}$ is pulsed, the voltage detecting circuit 10 is provided with means for integrating this.

Figure 9:
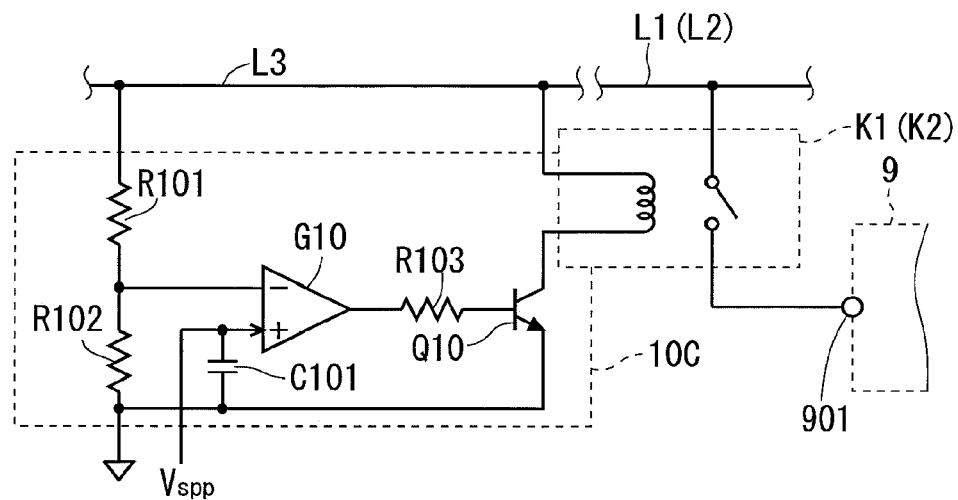
FIG. 9 is a circuit diagram exemplarily showing a circuit that can be employed as the voltage detecting circuit in the fourth embodiment of the present invention.

FIG. 9 is a circuit diagram exemplarily showing a circuit 10C that can be employed as the voltage detecting circuit 10 in this embodiment. The configuration of the circuit 10C can be realized by adding a capacitor C101 to the circuit exemplarily shown in FIG. 3. The capacitor C101 is provided between the non-inverting input terminal of the comparator G10 and the first ground. In this configuration, a voltage obtained by integrating the rotation speed command $V_{spp}$ by the capacitor C101 is compared with the predetermined value $V_{spb}$. As illustrated in FIG. 9, relay switches are employed for the switches K1 and K2. This is because while the voltage detecting circuit 10 is supplied with, as its operating voltage, the second DC voltage from the power line L3 on the one hand, the fan motor unit 9 is supplied with the third DC voltage or the first DC voltage from the power line L1 or the power line L2.

Figure 10:
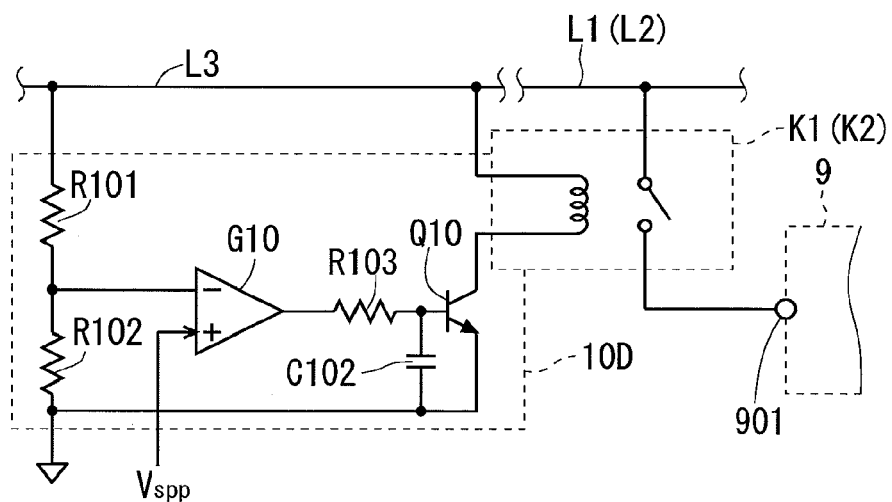
FIG. 10 is a circuit diagram exemplarily showing another circuit that can be employed as the voltage detecting circuit in the fourth embodiment of the present invention.

FIG. 10 is a circuit diagram exemplarily showing another circuit 10D that can be employed as the voltage detecting circuit 10 in this embodiment. In this case, too, relay switches are employed for the switches K1 and K2. The configuration of the circuit 10D can be realized by adding a capacitor C102 to the circuit exemplarily shown in FIG. 3. The capacitor C102 is provided between the output terminal of the comparator G10 and the emitter of the transistor Q10 (here, the emitter of the transistor Q10 is connected to the first ground). In this configuration, a voltage obtained by integrating a signal as a result of comparison between the rotation speed command $V_{spp}$ and the predetermined value $V_{spb}$ by the capacitor C102 is applied to the base of the transistor Q10. A time constant for the integration is determined by the resistor R103 and the capacitor C102. If the voltage obtained by the integration functions as a base bias of the transistor Q10, the transistor Q10 is turned on, and the switch K1 (K2) is turned on. If the voltage does not function as a base bias, the transistor Q10 is turned off, and the switch K1 (K2) is turned off.

The circuit 10D employs an npn transistor as the transistor Q10, but can employ a transistor of a different conductivity type. Thus, the output from the comparator G10 can be considered as a signal whose absolute value increases by the rotation speed command $V_{spp}$ exceeding the predetermined value $V_{spb}$. Then, the switch K1 (K2) becomes conductive/nonconductive respectively depending on whether or not a value of integral of the signal functions as the base bias of the transistor Q10. Whether or not the value of integral of the signal functions as the base bias of the transistor Q10 can be considered as whether the value of integral is equal to or greater than a different predetermined value or smaller than the different predetermined value.

The circuit 10D is more preferable than the circuit 10C in terms of a load relating to the output stage of the MCU 6 being reduced.

Fifth Embodiment

Figure 11:
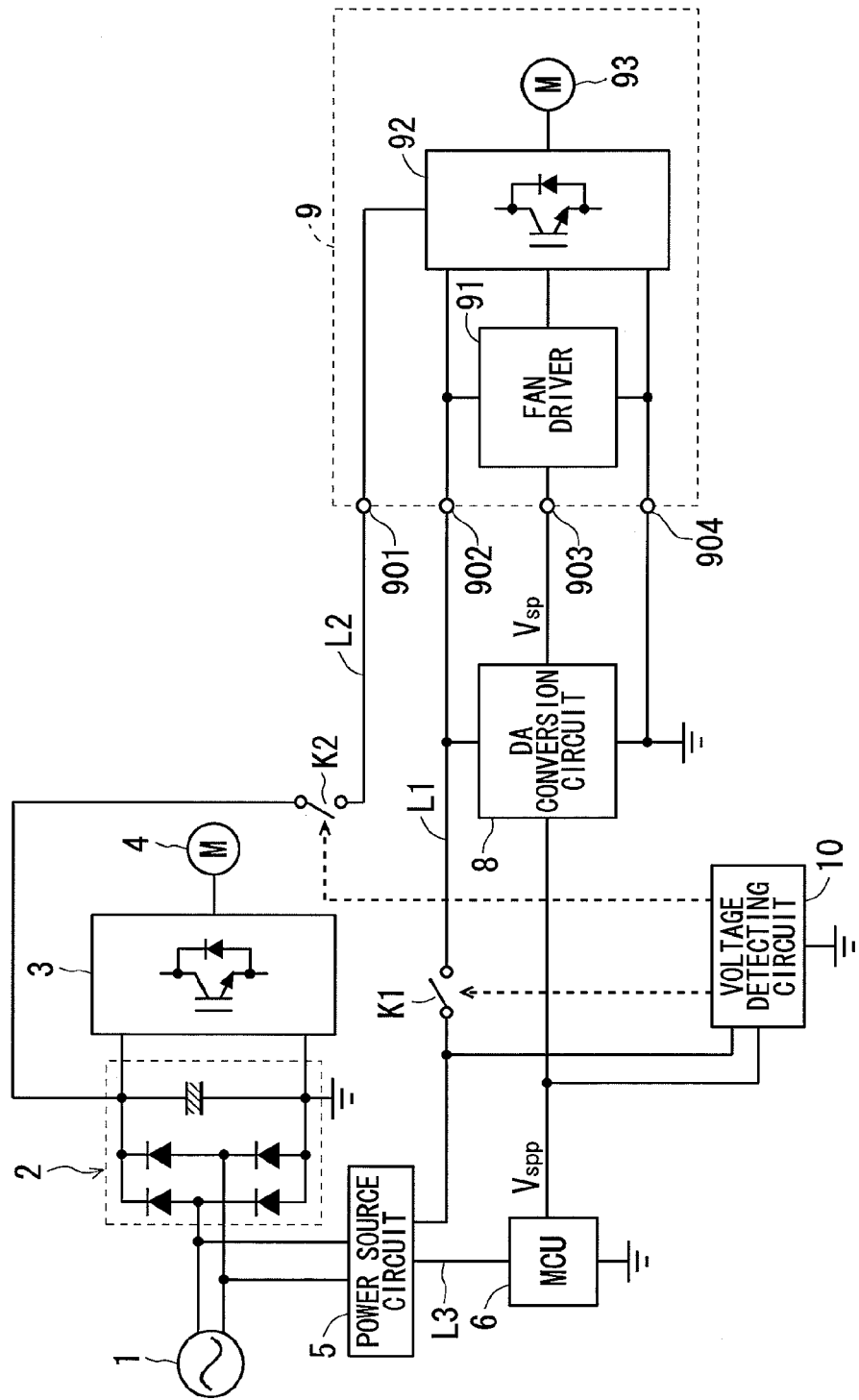
FIG. 11 is a circuit diagram showing a configuration of a motor system according to a fifth embodiment of the present invention.
Figure 12:
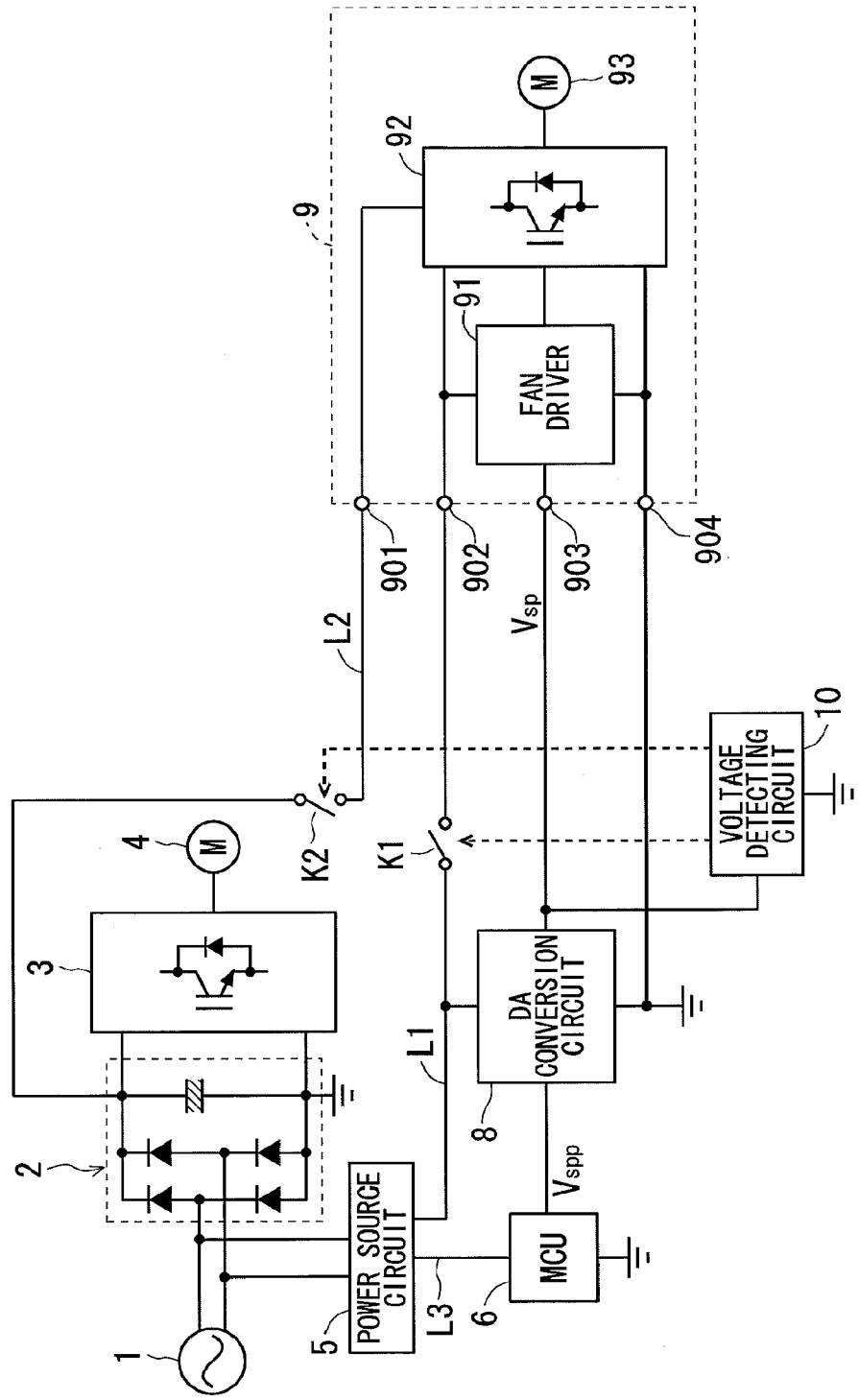
FIG. 12 is a circuit diagram showing a configuration of a motor system according to the fifth embodiment of the present invention.

When the MCU 6 is connected to the second ground instead of the first ground, the separation of the grounds by the photocoupler 7 is not necessary. Thus, the rotation speed command $V_{spp}$ is directly input to the DA conversion circuit 8. FIG. 11 shows a case in which the switch K1 is provided along the power line L1 and closer to the side of the power source circuit 5 than the DA conversion circuit 8. FIG. 12 shows a case in which the switch K1 is provided along the power line L1 and closer to a side of the fan motor unit 9 than the DA conversion circuit 8.

While the invention has been shown and described in detail, the foregoing description is in all aspects illustrative and not restrictive. It is therefore understood that numerous modifications and variations can be devised without departing from the scope of the invention.

The invention claimed is:

1. A motor driving system comprising:
   command value output means configured to output an analog value according to a rotation speed command;
   a first power line having first switching means;
   a drive circuit, to which power is supplied via said first switching means and said first power line, driving a motor supplying rotation based on said analog value; and
   switching control means configured to make said first switching means nonconductive when said analog value is smaller than a first predetermined value, and independent of said command value output means.

2. The motor driving system according to claim 1, wherein said drive circuit includes an inverter outputting current to said motor and a driver controlling said inverter, and said first power line is a power supply path for operation power to said driver.

3. The motor driving system according to claim 2, further comprising:
a second power line having second switching means, wherein
said second power line is a power supply path for input power to said inverter, and
said switching means also makes said second switching means nonconductive when said analog value is smaller than a second predetermined value.

4. A motor system comprising:
the motor driving system according to claim 2; and
a motor unit having said drive circuit and said motor that are built therein.

5. The motor driving system according to claim 1, wherein
said drive circuit includes an inverter outputting current to said motor, and
said first power line is a power supply path for input power to said inverter.

6. A motor system comprising:
the motor driving system according to claim 1; and
a motor unit having said drive circuit and said motor that are built therein.

7. A motor driving system comprising:
a microcomputer unit configured to output a pulse signal according to a rotation speed command;
a power line having switching means;
a DA converter, to which power is supplied via said switching means and said power line, outputting an analog value after performing D/A conversion to said pulse signal;
a drive circuit, to which operation power is supplied via said switching means and said power line, driving a motor supplying rotation based on said analog value; and
switching control means making said switching means nonconductive when a value of integral of said pulse signal is smaller than a predetermined value, and independent of said DA converter.

8. The motor driving system according to claim 7, wherein
said pulse signal is configured such that a pulse width and a duty ratio during a predetermined period after power starts being supplied to said drive circuit are smaller than after said predetermined period ends.

9. A motor system comprising:
the motor driving system according to claim 7; and
a motor unit having said drive circuit and said motor that are built therein.

10. A motor driving system comprising:
a microcomputer unit configured to output a pulse signal according to a rotation speed command;
a power line having switching means;
command value output means, to which power is supplied via said switching means and said power line, and that is configured to output an analog value after performing D/A conversion to said pulse signal;
a drive circuit, to which operation power is supplied via said switching means and said power line, driving a motor supplying rotation based on said analog value; and
switching control means configured to make said switching means nonconductive when a value of integral of a signal whose absolute value increases upon said pulse signal exceeding a predetermined value is smaller than another predetermined value, and independent of said command value output means.

11. The motor driving system according to claim 10, wherein
said pulse signal is configured such that a pulse width and a duty ratio during a predetermined period after power starts being supplied to said drive circuit are smaller than after said predetermined period ends.

12. A motor system comprising:
the motor driving system according to claim 10; and
a motor unit having said drive circuit and said motor that are built therein.

* * * * *